United States Patent
Spicer et al.

(10) Patent No.: US 8,170,695 B2
(45) Date of Patent: May 1, 2012

(54) APPLIANCE INCORPORATING LOAD SELECTIVITY WITHOUT EMPLOYMENT OF SMART METERS

(75) Inventors: Lucas Bryant Spicer, Louisville, KY (US); John K. Besore, Louisville, KY (US)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 12/837,898

(22) Filed: Jul. 16, 2010

(65) Prior Publication Data

US 2012/0016532 A1    Jan. 19, 2012

(51) Int. Cl.
  *G05B 11/01* (2006.01)
  *G06F 7/00* (2006.01)

(52) U.S. Cl. ............ 700/22; 700/90; 700/295; 700/296; 708/200; 708/250; 708/490; 708/504; 708/505; 708/650; 708/651; 708/670; 708/680

(58) Field of Classification Search .................... 700/22, 700/90, 286, 295, 296; 235/61 R; 708/200, 708/250, 490, 504, 505, 650, 651, 670, 680
See application file for complete search history.

(56) References Cited

U.S. PATENT DOCUMENTS

| | | | |
|---|---|---|---|
| 5,430,430 A | 7/1995 | Gilbert | |
| 5,544,036 A | 8/1996 | Brown, Jr. et al. | |
| 6,167,389 A | 12/2000 | Davis et al. | |
| 6,792,439 B2 * | 9/2004 | Schmidt | 708/250 |
| 7,058,673 B2 * | 6/2006 | Tang | 708/204 |

* cited by examiner

*Primary Examiner* — Sean Shechtman
(74) *Attorney, Agent, or Firm* — Fay Sharpe LLP

(57) ABSTRACT

Methods and a system are disclosed for one or more appliances including a controller for managing power consumption within a household. The controller is configured to receive and process a signal indicative of one or more energy parameters of an associated energy utility, including at least a peak demand period or an off-peak demand period. A generated serial number is obtained from an original serial number of the appliance or controller, which is configured for a signal to communicate to the appliance within a population and command the appliance to operate in an energy savings mode and a normal mode at various time periods. The generated serial number (GSN) is used to segregate a total population into segments to provide granularity in assigning DR activations and deactivations based upon the GSN.

15 Claims, 4 Drawing Sheets

APPLIANCE INCORPORATING LOAD SELECTIVITY WITHOUT EMPLOYMENT OF SMART METERS

BACKGROUND

This disclosure relates to energy management, and more particularly to electrical device control methods and electrical energy consumption systems. The disclosure finds particular application to energy management of appliances, for example, dishwashers, clothes washers, dryers, HVAC systems, etc.

In order to reduce high peak power demand, many utilities have instituted time of use (TOU) metering and rates, which include higher rates for energy usage during on-peak times and lower rates for energy usage during off-peak times. As a result, consumers are provided with an incentive to use electricity at off-peak times rather than on-peak times and to reduce overall energy consumption of appliances at all times.

Utility power systems become "smart" and demand response enabled by employing a head end management system, such as a company or program responsible for monitoring and running a demand response program. This usually requires equipment and time investments by utilities to install automatic meter reading (AMR) systems, advanced metering infrastructure, or other types of "smart" utility meters in each home. AMR systems, for example, provide for automatically collecting consumption, diagnostic, and status data from water meter or energy metering devices (water, gas, electric) and transferring that data to a central database for billing, troubleshooting, and analyzing. AMI represents the networking technology of fixed network meter systems that go beyond AMR into remote utility management. The meters in an AMI system are often referred to as smart meters, since they can use collected data based on programmed logic.

Smart grid applications improve the ability of electricity producers and consumers to communicate with one another and make decisions about how and when to produce and consume power. Demand response (DR) technology, for example, allows customers to shift from an event based demand response where the utility requests the shedding of load, towards a more 24/7 based demand response where the customer sees incentives for controlling load all the time. One advantage of a smart grid application is time-based pricing. Customers who traditionally pay a fixed rate for kWh and kW/month can set their threshold and adjust their usage to take advantage of fluctuating prices. Another advantage, is being able to closely monitor, shift, and balance load in a way that allows the customer to save peak load and not only save on kWh and kW/month but be able to trade what they have saved in an energy market. However, this involves sophisticated energy management systems, incentives, and a viable trading market.

When TOU or DR events occur, a number of users turning appliances on at the same time can create an initial influx of power that is up to several times the normal load on a power grid. This initial influx could compromise a power grid as well as cause it to be fully loaded, and thus, cause a reduction or shut off in power temporarily (e.g., brown outs or black outs). In addition, expenditures to run outside "peaker plants" are costly and may not be as environmentally friendly.

Therefore, a need exists to provide a method and system to run demand response systems without a head end investment, such as acquiring smart meters or two-way communication. Utilities have a need to instruct segregated populations of power consuming devices to enable them to limit peak load and/or smooth payback spikes for saving money and avoiding power outages without requiring smart meter employment.

SUMMARY

More specifically, the present disclosure provides an appliance with a memory comprising a controller in communication with an associated utility. An original serial number assigned to either the appliance and/or a controller (e.g., a processor) of the appliance is converted to a generated serial number for communication with the utility. This generated serial number is used indirectly to alter parameters of the device, such as run time and/or temperature set points as well as assigning different devices to different populations as a method to control payback load spikes.

In one embodiment, a non-random parametric value generator of an appliance is configured to enable the appliance to change demand response events, different demand response profiles for an assigned population subset, user inputs and price signals received based on a generated serial number formed from the original serial number. An appliance is in communication with the utility via a signal formatted for the particular generated serial number generated at the appliance.

In another embodiment, a serial number generation algorithm is provided for enabling communication with a utility from a generated serial number. The method includes obtaining an original serial number to generate a generated serial number. A replacing number for a first number to be replaced. The number to be replaced is substituted with the replacing number, if the replacing number is less than ten, or with a remainder of the replacing number that is not divisible by 10, if the replacing number is greater than nine. An additional replacing number is generated for each number at a higher place holder than the first number to be replaced.

The advantages of this system is that programmable communicating thermostats or other communicating devices for an appliance that can receive only one-way communication signals (e.g., radio data system communication, pager, etc.) can still execute a DR program with load shedding and payback spike reduction. This disclosure is not limited to any one type of communication infrastructure. For example, a two-way communication infrastructure may be employed also. Further, the utility does not require "smart meters" or a head end manager service, and the residential users do not require a home area network, broadband internet or a computer for communication.

Another advantage is a low cost, low maintenance self managed DR program that is based on the enabled devices in the home not the infrastructure around them.

DETAILED DESCRIPTION

Figure 1:
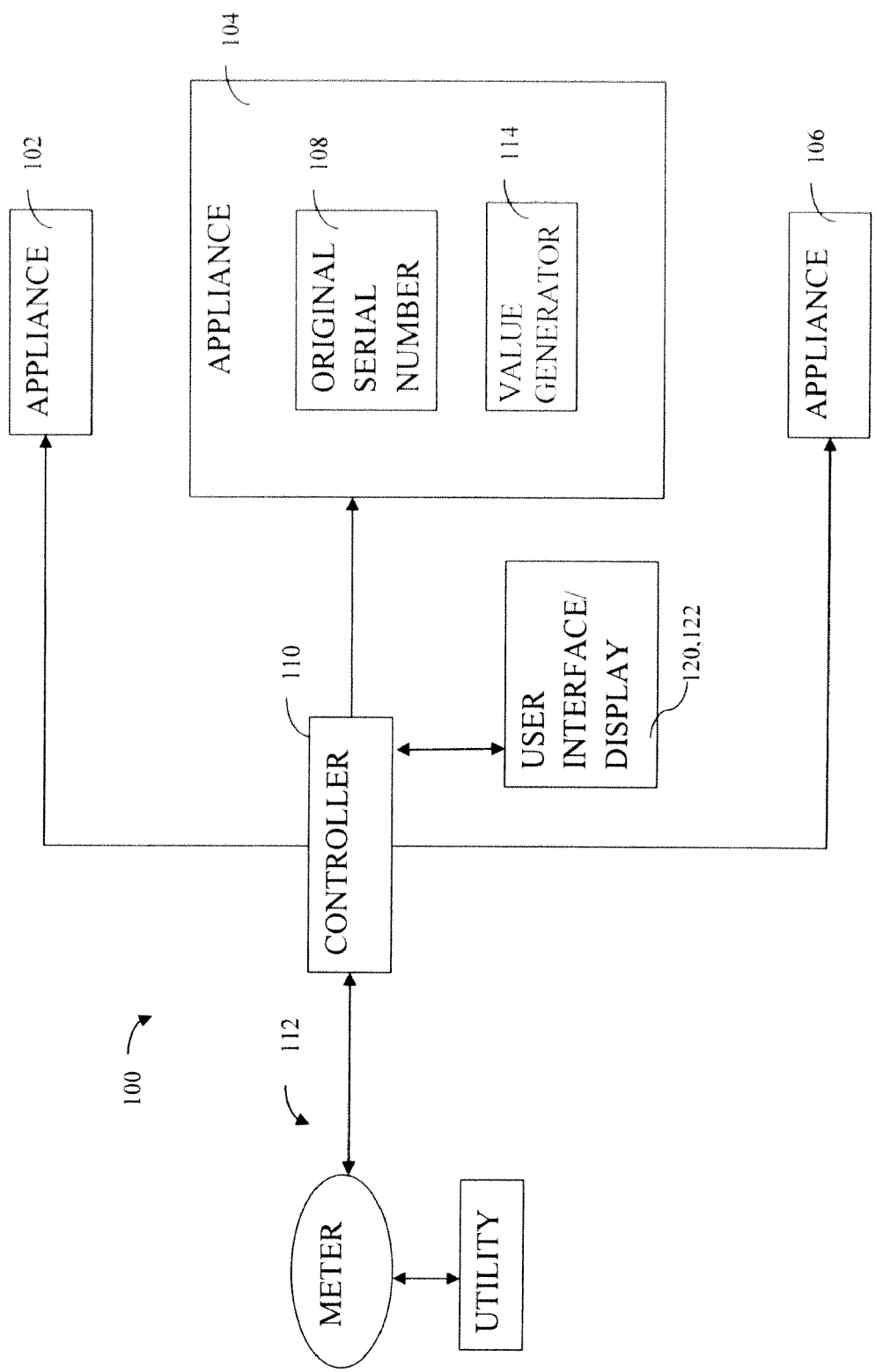
FIG. 1 is a schematic illustration of an energy management system with one or more appliances in accordance with one aspect of the present disclosure.

Utilities provide energy through systems that shed load at peak times during the day. For example, about 50% of home energy cost is due to heating and cooling. In the hot summer months air conditioning can account for 60-70% of home energy costs. Peak loads during hot summer days can approach the supply level of the provider, which produces brownouts and higher average energy costs. To constantly meet demand, utilities can receive power from outside on the market or engage additional plants to generate power (e.g., gas fired peaker plants). This costs a lot of money with additional investment to have plants on stand-by that are not as efficient usually. Thus, concerns exist for how to dispatch load so that it is lessened on the system and how to meet energy requirements without additional plants or having a brownout.

Demand response (DR) systems control energy load at the home user level. For example, air conditioning (AC) load can be controlled with a Programmable Communicating Thermostat (PCT). DR systems should increase average user comfort by reducing loss of service failures and total energy costs (versus paying for auxiliary power generation). One way of shedding load and/or smooth payback load spikes is to provide head end equipment at the consumer receiving end of the grid through a high initial investment cost: installing "smart meters," two-way communication systems and infrastructure. This may also involve maintenance costs involving service of a head end manager, servicing communication systems and several devices. The cost and complexity of such systems reduces acceptance and adoption by both utilities and consumers.

One option involving a low cost investment is to utilize one-way communication system that can rely on FM radio data system (FM-RDS) communication, or other one-way system, such as a pager (about 900 MHz), Zigbee, wifi, etc. The protocol is as ubiquitous as the FM radio stations that may carry it and the signal reception is also as ubiquitous as the coverage map of a high powered FM radio transmitter, for example.

A low investment cost can be realized through various systems, such as a PCT that costs little more than a standard digital thermostat with no addition installation costs. The equipment can involve a signal/communication box coupled to an appliance for receiving a message that informs a processor of an appliance to turn the appliance on/off (e.g., an air conditioner compressor, electric water heater, etc.). The manner in which appliances may be signaled to power on or off can be done in a moving fashion around the city grid, for example, to one subdivision at a time, or in a selectable fashion for users where, for example, addresses or serial numbers are used to distinguish among candidates. This prevents all air conditioners within a certain radius or population from coming off or on at one time, which could have a devastating effect.

In one exemplary embodiment, a generated serial number (GSN) is created from the original serial number of the appliance and/or the appliance's microcontroller in order to produce a non-random number to be distributed or spread out evenly across a distribution curve ranging from the lowest serial number possible to the highest serial number possible (e.g., 000000 thru 999999). This distribution represents the generated serial numbers spread throughout a subset population of serial numbers. This will be discussed in greater detail below.

A generated value (GV) is produced as a percentage from the GSN. Any given GSN of a particular appliance is divided by the maximum possible generated serial number to determine where in the subset population the GSN lies. For example, if serial numbers comprise six digits a GSN produced from the OSN could be 555555. When the GSN is divided by the maximum possible GSN this determines its percentage of penetration within the population; for example, for the GSN of 555555, the GV is 555555/999999, which is about 55% after multiplying by 100. The GV is therefore a level or percentage in which the GSN represents within the subset population and is used for selecting where to shut down or to provide power within the subset population of homes. For example, the top fifty percent of homes may have their setpoint temperature raised before the lower 50% of appliances based on the distribution of GSN numbers, which is a random distribution to treat customers equally by revolving the GSN number throughout the distribution by either decrementing the GV or incrementing it with each DR event.

Raising the setpoint temperature of a home for a given amount of time removes that home's air conditioning (AC) load until the home warms to a new raised setpoint. When the given amount of time is over, the homes attempt to return to their original setpoints simultaneously, which causes a payback load spike or rebound peak as it is sometimes referred to. However, if a subset population of the total population delays having their setpoint adjusted, their load reduction can be used to offset and smooth the payback caused by the remaining population. This setback is governed by the GVs created from GSNs that are incremented or decremented for subsequent DR events. As stated above, the GSNs are in turn generated from original serial numbers of an appliance and/or the appliance's microcontroller provided by a manufacturer.

All appliances are assigned a sequential serial number at production either for the appliance as a whole or the appliance's microprocessor, or both. A random distribution of the generated values is in turn produced. The distribution is then used to equitably process different populations of homes for DR event schemes. For purposes of this disclosure, the sequentially assigned serial numbers will be called an Original Serial Number (OSN) and the generated numbers will be called a Generated Serial Number (GSN) while percentage values of the GSNs within a subset or population of GSNs will be coined generated values (GVs).

An advantage to creating a distribution of values for GVs is so that groups of appliances or subset populations of appliances in homes do not follow the same powering and off scheme for a DR event. For example, a distribution of generated values prevents all of the low end serial numbers to end up following the same or similar DR event scheme. As often may be the case for example, where devices of closely numbered OSNs are purchased from the manufacturer in a particular regional area or at a particular time, the OSNs of those appliances are thus prevented from being globally random or randomly distributed across the total population causing controlling schemes to not be as effective. Thus, GSNs generated from the OSNs can provide non-random numbers to be distributed or spread across an entire range of values for a given total population. Further, in order to make the treatment of all groups or subset populations within a given total population of appliances equitable, the GVs are incremented or decrement through the range of all possible values, and consequently, all possible subset populations. The GVs are then used to control DR events within subset populations.

FIG. 1 schematically illustrates an exemplary energy management system 100 for one or more appliances 102, 104, 106 according to one aspect of the present disclosure. Each of the appliances 102, 104, 106 can comprise one or more power consuming features/functions. For example, appliance 104 can be a refrigerator and/or an HVAC system including a refrigeration system. Each appliance and/or controller includes an original serial number 108. A non-random parametric value generator 114 is configured to enable the appliance to change demand response events, different demand response profiles for an assigned population subset, user inputs and price signals received based on a generated serial number formed from the original serial number 108. The energy management system 100 generally comprises a controller 110 for managing power consumption within a household. The controller 110 is operatively connected to each of the power consuming features/functions. The controller 110 can include a micro computer on a printed circuit board, which is programmed to selectively send signals to an appliance control board 124, 126, 128 of appliance 102, 104, and/or 106 respectively in response to the input signal it receives. The appliance controller will then, in turn, manipulate energization of the power consuming features/functions thereof.

The controller 110 is configured to receive a signal 112 by a receiver and process the signal indicative of one or more energy parameters and/or a utility state of an associated energy supplying utility, for example, including availability and/or current cost of supplied energy. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 110 is configured to at least one of communicate to, control and operate the appliances 102, 104, 106 in one of a plurality of operating modes, including at least a normal operating mode and an energy savings mode in response to the received signal. Specifically, each appliance can be operated in the normal operating mode during the off-peak demand state or period and can be operated in the energy savings mode during the peak demand state or period. As will be discussed in greater detail below, the controller 110 is configured to communicate with each appliance to precipitate the return of the appliances to the normal operating mode after the peak demand period is over to prevent an energy surge for the associated energy supplying utility. Alternatively, the control board of each appliance could be configured to receive communication directly from the utility, process this input, and in turn, invoke the energy savings modes, without the use of the centralized controller 110.

If the controller 110 receives and processes an energy signal indicative of a peak demand state or period at any time during operation of the appliances 102, 104, 106, the controller makes a determination of whether one or more of the power consuming features/functions of each appliance should be operated in the energy savings mode and if so, it signals the appropriate features/functions of each appliance to begin operating in the energy savings mode in order to reduce the instantaneous amount of energy being consumed by the appliances. The controller 110 is configured to communicate with the appliance control board 124 thru 128 to provide command instructions for the appliance control board to govern specific features/functions to operate at a lower consumption level and determine what that lower consumption level should be. This enables each appliance to be controlled by the appliance's controller where user inputs are being considered directly, rather than invoking an uncontrolled immediate termination of the operation of specific features/functions of an appliance from an external source, such as a utility. It should be appreciated that the controller 110 can be configured with default settings that govern normal mode and energy savings mode operation. Such settings in each mode can be fixed while others adjustable to user preference and to provide response to load shedding signals.

The controller 110 includes a user interface 120 having a display 122 and control buttons for making various operational selections. The display can be configured to provide active, real-time feedback to the user on the cost of operating each appliance 102, 104, 106. The costs are generally based on the current operating and usage patterns and energy consumption costs, such as the cost per kilowatt hour charged by the corresponding utility. The controller 110 is configured to gather information and data related to current usage patterns and as well as current power costs. This information can be used to determine current energy usage and cost associated with using each appliance in one of the energy savings mode and normal mode. This real-time information (i.e., current usage patterns, current power cost and current energy usage/cost) can be presented to the user via the display.

The duration of time that each appliance 102, 104, 106 operates in the energy savings mode may be determined by information contained in the energy signal. For example, the energy signal may inform the controller 110 to operate in the energy savings mode for a few minutes or for one hour, at which time each appliance 102, 104, 106 returns to normal operation. Alternatively, the energy signal may be continuously transmitted by the utility provider, or other signal generating system, as long as it is determined that instantaneous load reduction is necessary. Once transmission of the signal has ceased, each appliance returns to normal operating mode. In yet another embodiment, an energy signal may be transmitted to the controller 110 to signal each appliance 102, 104, 106 to operate in the energy savings mode. A normal operation signal may then be later transmitted to the controller to signal each appliance 102, 104, 106 to return to the normal operating mode.

Figure 2:
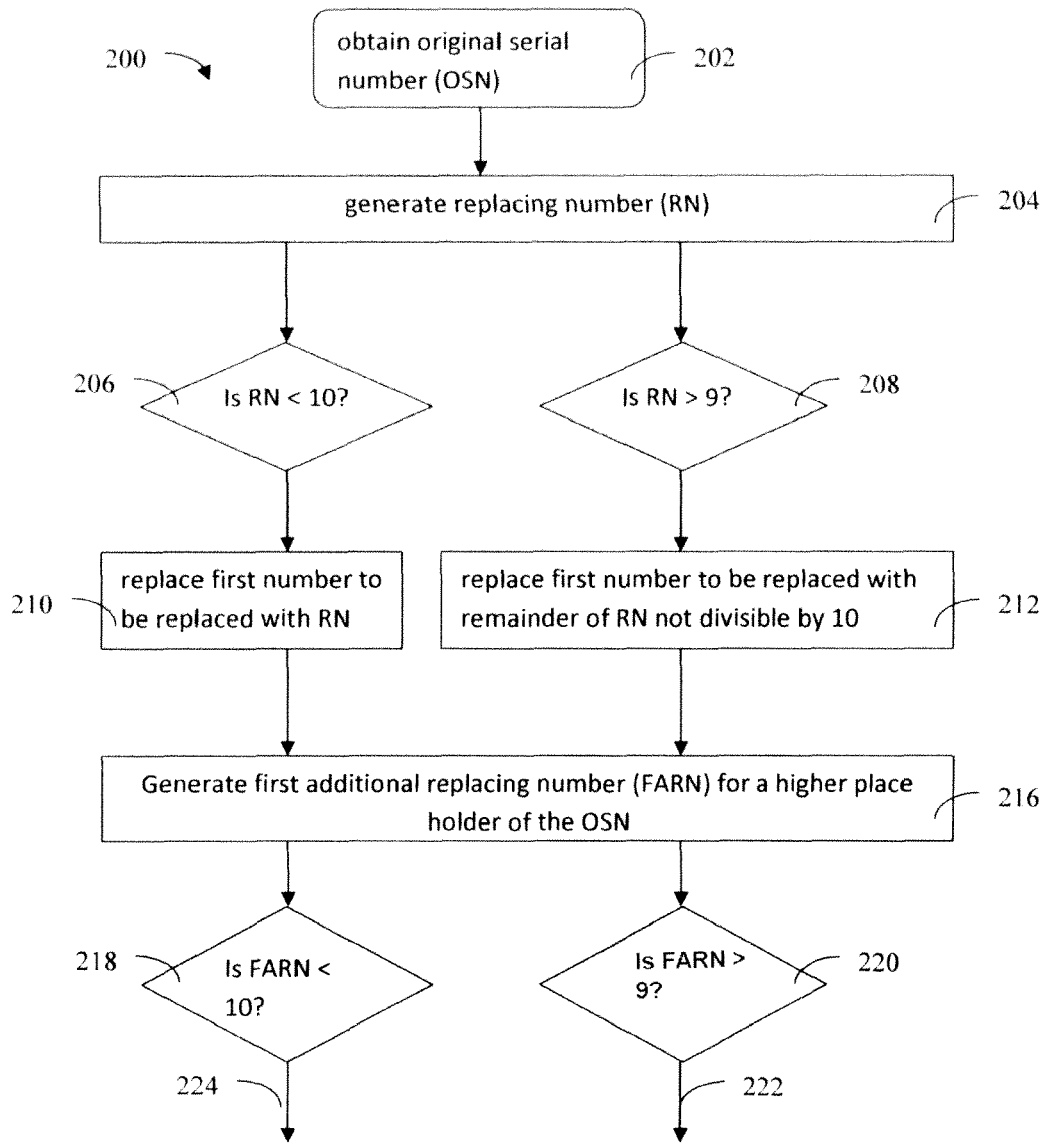
FIG. 2 is a flow diagram illustrating an example methodology for generating a generated serial number from an original serial number.

Referring now to FIG. 2, illustrates a method 100 for generating a GSN as an exemplary embodiment. At 202 an OSN is obtained from an appliance microprocessor or a microprocessor of an energy consuming device. The OSN is the serial number entirely or the last several digits of the serial number of any given length. For example, an OSN comprising serial numbers of 5 8 3 2 1 (or as a second example , a b c d e) may be obtained or stored.

Each position of each number is considered a place holder. Therefore, in the example where the OSN is 5 8 3 2 1 (or as a second example, a b c d e) the five or the a is at a higher place holder than any other number because it is in the first position, while the one or e would be in the last and lowest place holder since it is in the last position when reading from left to right.

At 204 a replacing number (RN) is generated for a first number to be replaced. For example, the third digit from the last being 3, or c in the second example, is the first number to be replaced. Generating the RN includes adding a one to the first number to be replaced and adding one to each number at a lower place holder than the first number to be replaced in the OSN, and thereafter, adding that sum to the third to the last digit.

At 206 it is determined if the RN is less than 10, and if the RN is greater than 9 at 208. If the RN is less than 10, then at 210 the first number to be replaced (e.g., 3 or c) is replaced with the RN (the sum of each number at a lower place holder plus one and the number to be replaced plus one). However, if the RN is greater than 9, then at 212 the first number to be replaced is replaced with the remainder of the RN that is not divisible by 10.

For example, the first number to be replaced is 3, or c, and thus, (1+1)+(2+1)+(3+1)=9→replaces the 3, or in the second example the numbers become (e+1)+(d+1)+(c+1) =X→Replaces c. Consequently, the new numbers become 5 8 9 2 1 and a b X d e.

At 214 a first additional replacing number (FARN) is generated for a higher place holder than the first number to be replaced in the OSN. This involves repeating the same process as discussed above until all higher digits have been replaced. In other words, all numbers in a higher place holder positions than 9 or X have the same process repeated as above to replace their respective numbers. The FARN is generated by adding a one to each number at and below the higher place holder position than the first number to be replaced, and thereafter, summing each number with the one added to it.

At 218 and at 220 whether the FARN is less than ten or greater than nine is determined. If the FARN is less than 10 then the method 100 flows at 224 and continues at 228 of FIG. 3 where each number at the higher place holder position being considered is replaced with the FARN respectively calculated for that position. If the FARN is greater than nine, the flow continues at 222 to the box at 226 where each number at a higher place holder than the first number is replaced with the remainder of the FARN for that place holder that is not divisible by ten.

For example, with the numbers generated thus far being 5 8 9 2 1 and a b X d e, the next higher place holder from the 9 or X (the first place holder to receive the RN), the FARN is generated to replace the 8 or.b. For example, (1+1)+(2+1)+ (9+1)+(8+1)=24/10, remainder=4, this can also be represented 24% 10=4, where % is the modulus operator common to programming languages that returns the remainder of an integer division operation; 4→Replaces 8, or in the second example, (e+1)+(d+1)+(X+1)+(b+1)=W→replaces b.

By way of further example, the next higher place holder is the 5 or the a. The process repeats until all numbers in a higher place holder position are generated from the OSN. For example, the number generated comprise 5 4 9 2 1 and a W X d e, and (1 +1)+(2+1)+(9+1)+(4+1)+(5+1)=26/10, remainder=6→Replaces 5; and (e+1)+(d+1)+(X+1)+(W+1) =V→Replaces a. The newly generated numbers thus become 6 4 9 2 1 and V W X d e.

Figure 3:
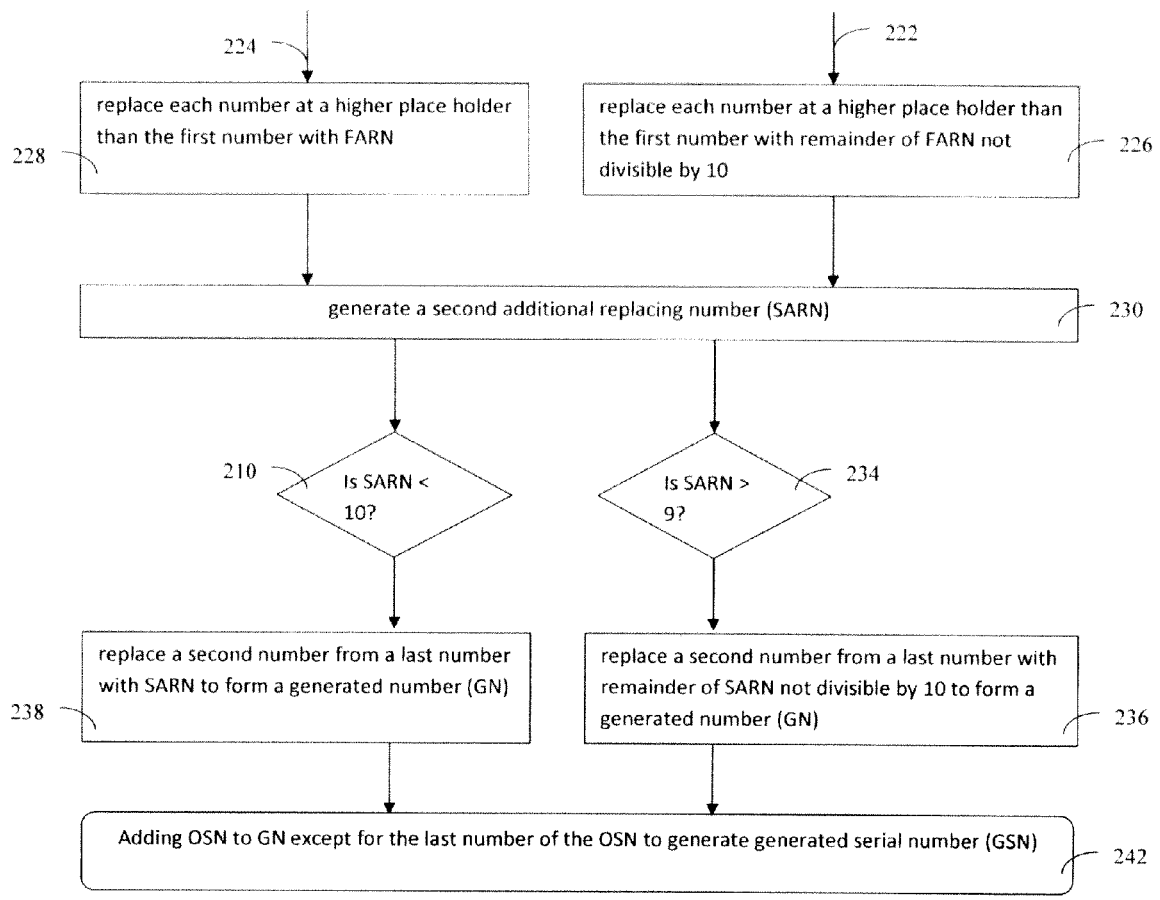
FIG. 3 is a flow diagram illustrating an example methodology for generating a generated serial number from an original serial number.

Referring now to FIG. 3, at 230 the method 200 continues for a second additional replacing number (SARN) to be generated. The SARN is generated by adding a one to each number at each place holder. In other words, a one is added to each digit in each place holder position. Then, each number with a one added to it is summed to generate the replacing number for the second number from the last number. In this case, the second number from the last number having the one added to it is first multiplied by two or added twice in the summing to generate the SARN.

At 232 it is determined whether the SARN is less than ten, or at greater than nine at 234. If the SARN is less than ten, then at 238 the second number from the last number is replaced with the SARN, and thereby forming a generated number (GN). If the SARN at 234 is greater than nine, then at 236 the second number from the last number is replaced with the remainder of the SARN that is not divisible by 10, and thereby forming a generated number (GN).

For example, the same process as above is performed on all the digits and then the value is stored in the second to last digit slot. The generated numbers thus far provide 6 4 9 2 1 and V W X d e. An example of replacing the second to the last digit with the SARN is as follows: (1+1)+(2+1)+(9+1)+(4+1)+(6+ 1)+(2+1)=30/10, remainder=0→Replaces 2; and (e+1)+(d+ 1)+(X+1)+(W+1)+(V+1)+(d+1)=Y→Replaces d. The GN is thus 6 4 9 0 1 and V W X Y e.

At 242 the OSN obtained at 202 in FIG. 2 is added to the GN, except for the last number of the OSN, to generate the GSN. The last digit remains unchanged because it already has an even distribution throughout a population of OSNs. As with any of the previous steps if any digits sum to greater than 9, the remainder from division with 10 is stored, this keeps digits to values between 0-9.

One example is shown as follows:

```
      † †
    5 8 3 2 | 1
  + 6 4 9 0 | 1
  ─────────────
  = 1 2 2 2 | 1
```

Other examples of OSN→GS include the following conversions: 0 0 0 0 1→9 4 4 1 1; 0 0 0 0 2→3 1 5 5 2; 0 1 0 1 5→0 1 9 4 5; 3 2 7 3 4→5 2 4 0 4; 6 0 8 8 0→5 1 7 7 0; 6 5 5 1 2→4 8 6 2 2.

The generated numbers are not "random" numbers; the algorithm will always produce a specific GSN for a given OSN, but the generated numbers are evenly distributed across the total range of possible values of numbers that contain the same number of digits as the serial numbers. That means any given sequential subset of OSNs will produce GSN that fill in across the whole range of possible values. The benefit is, if functions or device settings are seeded from the GSN the overall effect for a large population is similar to that if a global randomization scheme were used.

Figure 4:
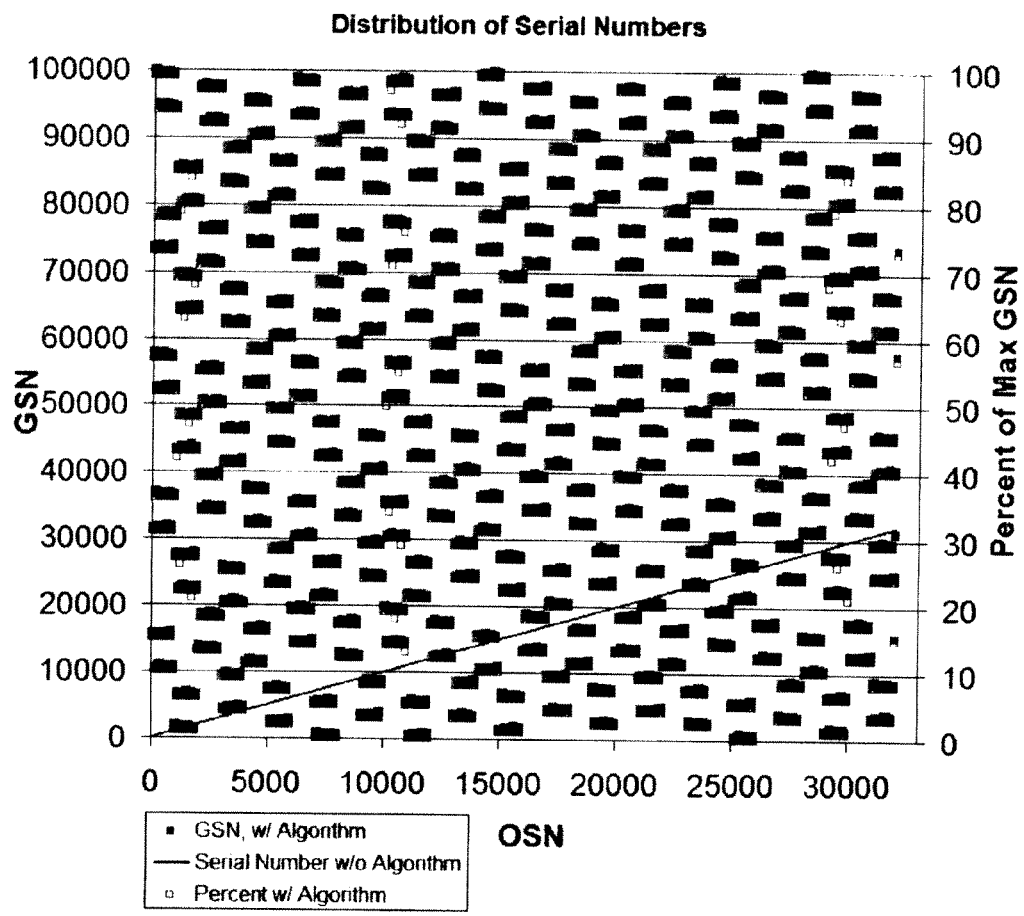
FIG. 4 is a graph illustrating a distribution of generated serial numbers in accordance another aspect of the present disclosure.

FIG. 4 is a graph that illustrates how generated values (GV)s, which are determined from GSNs generated from the original serial numbers (OSN)s, are distributed among all the possible values in the range of possible values for all percentage values of the maximum serial number. The linear increase of OSNs illustrates how a system based entirely on OSNs would not produce a random distribution of values due to clumping of percentages. Because any given population may contain many sequential OSNs and those may be from a small subset of all possible serial numbers, a control scheme based on these alone would not be as effective or as evenly distributed as one based on generated values formed from the OSNs.

With such a system as described here, the user also maintains control over the devices because the user has the ability to override utility price signals (with inputs given about any resulting increased cost of overriding) and the user's personal comfort or price settings, which determine the limits of responses and the standard response for a given signal.

GSNs effectively influence (upon command) the settings and responses of thermostats or appliances of homes in a similar way to a global randomization scheme without using random numbers, statistical distributions, "smart meters" (e.g., AMR/AMI) or head end management to generate GSNs from an original serial number. Within each device, the GV that is derived from the GSN is calculated and used by the device for responding to input signals from the utility. Signals from the utility therefore are operable to alter variables of the appliances that affect payback spike loads in the population by using the GSN to communicate information to the appliance's controller. Variables of the appliance that may be affected by the signal message payload comprise run times, power consumption, time of shifting to energy savings mode, time of return to Normal operation, temperature setpoints, price controls and a population assignor configured to designate a particular subset population that the particular appliance is assigned to in the total population.

The GV is further altered by influence from the GSN so that a distribution of values and responses is seen over the entire population and all home users experience equal responses over an extended period of time, as discussed above with regard to DR events. For example, the GV is made to increment or decrement through all total possible percentage values so that subset populations of different percentages are assigned to appliances equitably. Consequently, a population of homes has "return to normal operation" times that are capable of being realized with a one-way communication signal using the GSN in the signal payload, while the "return to normal operation" times are indexed over a distributed time period (e.g., weeks or days) so that no one particular GSN is delayed any longer than any other GSN in a given time frame. This indexing insures that no one household is treated differently than another relative to the amount of time they are placed in a specific mode.

The method and systems herein are applied to any other communicating appliance, device or controller (e.g., PCT, HEM, etc.). In addition, the method and apparatus described are not limited to a one-way communication system, but may be implemented in a two-way communication protocol as well. There are several ways to accomplish this communication, including but not limited to power line carrier (PLC) (also known as power line communication), FM, AM, SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand and control rebound peaks for its resources. The cost can be indicative of the state of the demand for the utility's energy, for example a relatively high price or cost of supplied energy is typically associated with a peak demand state or period and a relative low price or cost is typically associated with an off-peak demand state or period.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method for a demand response system to control load shedding and payback spiking in a population of energy consuming devices by producing generated serial numbers from original serial numbers of at least one device, executed via a controller with at least one memory storing executable instructions for the method, comprising:
    obtaining an original serial number to generate a generated serial number from the device or a device microcontroller;
    generating a replacing number for a first number to be replaced in the original serial number;
    replacing the first number to be replaced with the replacing number if the replacing number is less than ten, or with a remainder of the replacing number that is not divisible by 10, if the replacing number is greater than nine;
    generating a first additional replacing number for each number at a higher place holder than the first number to be replaced in the original serial number;
    replacing each number in the original serial number at the higher place holder than the first number to be replaced with the first additional replacing number if the first additional replacing number is less than ten, or with a remainder of the first additional replacing number that is not divisible by 10, if the first additional replacing number is greater than nine;
    generating a second additional replacing number for a second number from a last number in the original serial number to replace the second number;
    replacing the second number from the last number with the second additional replacing number if the second additional replacing number is less than ten, or with a remainder of the second additional replacing number that is not divisible by 10 if the second additional replacing number is great than nine to form a generated number; and
    adding the original serial number to the generated number except for the last number in the original serial number to generate the generated serial number.

2. The method of claim 1, further comprising:
    calculating a generated value from the generated serial number by dividing the generated serial number by a largest whole number possible using the number of digits in the generated serial number; and
    segregating the population of devices into specific segments by assigning segments according to the generated value for that device.

3. The method of claim 1, further comprising:
    instigating demand response events in the energy consuming devices by selectively imposing energy saving modes and normal operating modes to select segregations at different times via the generated serial number of respective devices or microcontrollers.

4. The method of claim 1, wherein adding the original serial number to the generated number comprises not adding values that are carried over in addition.

5. The method of claim 1, wherein generating the replacing number for the first number to be replaced comprises:
    adding one to the first number to be replaced and to each number at a lower place holder in the original serial number than the first number to be replaced; and
    summing each number with the one added thereto to get the replacing number.

6. The method of claim 1, wherein generating the first additional replacing number for each number at the higher place holder than the first number to be replaced comprises:
    adding one to each number at and below the higher place holder than the first number to be replaced; and
    summing each number with the one added thereto.

7. The method of claim 1, wherein generating the second additional replacing number for the second number from the last number to replace the second number, comprises:
    adding one to each number at each place holder;
    summing each number with one added thereto to generate the replacing number for the second number from the last number, wherein the second number with one added thereto is first multiplied by two or added twice.

8. The method of claim 1, wherein the generated serial numbers are evenly distributed across a total range of possible values of numbers that comprise the same number of digits respectively as the original serial numbers for the population.

9. The method of claim 1, wherein the generated serial numbers are non-random and deterministically generated based on the original serial number assigned to the appliance and/or a microcontroller of the appliance.

10. A method for an appliance to control load shedding and payback spiking in a population by producing generated serial numbers from original serial numbers, executed via a controller with at least one memory storing executable instructions for the method, comprising:

obtaining an original serial number from the appliance to generate a generated serial number therefrom;

generating a replacing number for a first number of the original serial number to be replaced;

substituting the number to be replaced with the replacing number if the replacing number is less than ten, or with a remainder of the replacing number that is not divisible by 10, if the replacing number is greater than nine;

generating a first additional replacing number for each number at a higher place holder than the first number to be replaced;

replacing each number at the higher place holder than the first number to be replaced with the first additional replacing number if the first additional replacing number is less than ten, or with a remainder of the first additional replacing number that is not divisible by 10, if the first additional replacing number is greater than nine;

generating a second additional replacing number for a second number from a last number to replace the second number;

replacing the second number from the last number with the second additional replacing number if the second additional replacing number is less than ten, or with a remainder of the second additional replacing number that is not divisible by 10 if the second additional replacing number is great than nine to form a generated number;

adding the original serial number to the generated number except for the last number to generate the generated serial number; and altering variables of the appliance that affect payback load spikes in the population by using the generated serial number to obtain a communication to the appliance.

11. The method of claim 10, wherein the variables comprise a run time, a temperature set point, a price control and a population assignor configured to designate a particular subset population the appliance belongs to in the population.

12. The method of claim 10, wherein the communication is a one-way communication configured for communicating with the appliance with the generated serial number.

13. The method of claim 10, wherein adding the original serial number to the generated number comprises not adding values that are carried over in addition.

14. The method of claim 10, wherein generating the replacing number for the first number to be replaced comprises:

adding one to the first number to be replaced and to each number at a lower place holder in the original serial number than the first number to be replaced; and summing each number with the one added thereto to get the replacing number;

wherein generating the first additional replacing number for each number at the higher place holder than the first number to be replaced comprises:

adding one to each number at and below the higher place holder than the first number to be replaced; and summing each number with the one added thereto; and wherein generating the second additional replacing number for the second number from the last number to replace the second number, comprises:

adding one to each number at each place holder;

summing each number with one added thereto to generate the replacing number for the second number from the last number, wherein the second number with one added thereto is first multiplied by two or added twice.

15. The method of claim 10, wherein the communication is a two-way communication configured for communicating with the appliance with the generated serial number.

* * * * *